(No Model.)

J. F. THOMAS.
VEHICLE SPRING.

No. 395,463. Patented Jan. 1, 1889.

WITNESSES:
N. R. Davis.
C. Sedgwick.

INVENTOR:
J. F. Thomas
BY Munn & Co.
ATTORNEYS.

UNITED STATES PATENT OFFICE.

JAMES F. THOMAS, OF ALEXANDRIA, NEBRASKA.

VEHICLE-SPRING.

SPECIFICATION forming part of Letters Patent No. 395,463, dated January 1, 1889.

Application filed January 23, 1888. Serial No. 261,590. (No model.)

*To all whom it may concern:*

Be it known that I, JAMES F. THOMAS, of Alexandria, in the county of Thayer and State of Nebraska, have invented a new and useful Improvement in Side Springs for Vehicles, of which the following is a full, clear, and exact description.

This invention consists in certain novel constructions of the side springs of wagons and other vehicles, and in a combination of said springs with adjacent parts forming portions of the running-gear of the vehicle, substantially as hereinafter described, and pointed out in the claim.

Reference is to be had to the accompanying drawings, forming a part of this specification, in which similar letters of reference indicate corresponding parts in all the figures.

Figure 1:
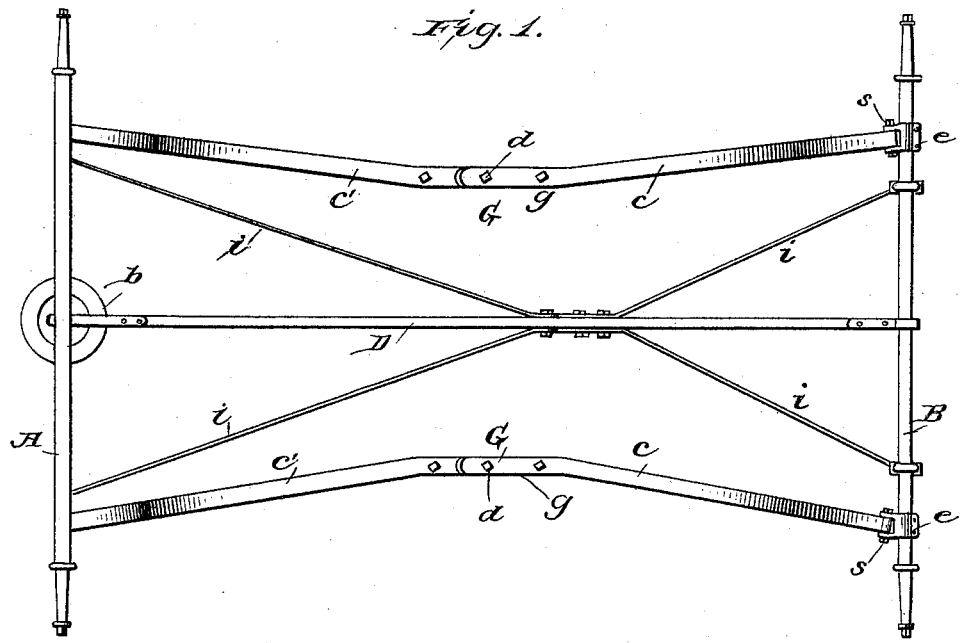
Figure 2:
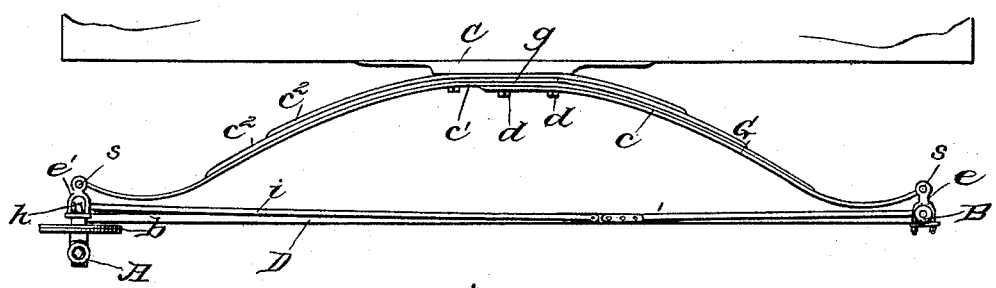
Figure 3:
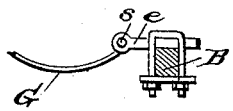

Figure 1 represents an under view of the running-gear, in part, of a vehicle with my improved springs applied; and Fig. 2, a side view of the same, with the body of the vehicle in part. Fig. 3 represents a modified construction of the clip which unites the spring with the axle.

A is the front axle, and B the rear axle, of the vehicle; C, the vehicle-body in part; D, the reach or pole, and $b$ the usual fifth-wheel.

G G are the side springs, each of which is strengthened in its rear by adding a half-leaf, $c$, beneath the other leaves, $c'$ $c^2$, of the spring, said half-leaf $c$ being secured at its forward end by the usual center bolts, $d$, and extending backward to form part of or connect with the clip-coupling $e$ on the rear axle. The next leaf, $c'$, above is the longest in the spring, and extends from the usual point of departure of the second leaf in its rear, thence forward to the front portion of the running-gear and forming part of or connecting at its extreme forward end with the forward spring-coupling, $e'$. The other leaves, $c^2$, are of the usual kind and applied or added as customary in other side springs. This construction gives great strength to the spring without impairing its elasticity. Both springs G G are constructed alike both in these and other respects.

To secure torsion and prevent side roll of the buggy or wagon, each of the springs G is made to bow inward or bent laterally in an inward direction near where the bolts $d$ secure the spring to the body of the vehicle. From this bent inward central portion, $g$, the spring in front and rear thereof diverges laterally in straight lines or courses, and the clips or couplings with which it connects at its outer end are bent where the connection is made or formed to present skew-joints or knuckles adapted to conform to the laterally-diverging terminal portions of the spring and to make the clip-bolt $s$, as shown, for either coupling $e$ cross the straight laterally-diverging portion of the spring at right angles and in proper relation with the center of the spring and coupling-pole of the vehicle.

The cross-bar $h$ of the vehicle is restrained from backward and forward motion by braces $i$ $i$ running from near either end of said bar to the coupling-pole D, thence to the rear axle and secured by bolts and clips.

Having thus described my invention, what I claim as new, and desire to secure by Letters Patent, is—

The combination, with the vehicle-body and the front and rear axles, of the continuous bowed side springs, G G, bent laterally inward at the middle parts, $g$, and there secured to the vehicle-body or cross-piece thereof, thence diverging in straight lines outward and clipped to the front and rear axles, substantially as set forth.

JAMES F. THOMAS.

Witnesses:
W. R. FULTON,
J. L. SPAULDING.